(12) United States Patent
Solaja

(10) Patent No.: US 9,743,093 B2
(45) Date of Patent: Aug. 22, 2017

(54) GAMING MACHINE AND METHOD EMPLOYING VIDEO COMPRESSION

(71) Applicant: Atlas Gaming Technologies Pty. Ltd., Port Melbourne (AU)

(72) Inventor: Zenja Solaja, Port Melbourne (AU)

(73) Assignee: Atlas Gaming Technologies Pty Ltd. (AU)

( * ) Notice: Subject to any disclaimer, the term of this patent is extended or adjusted under 35 U.S.C. 154(b) by 452 days.

(21) Appl. No.: 14/265,022

(22) Filed: Apr. 29, 2014

(65) Prior Publication Data
US 2015/0304663 A1 Oct. 22, 2015

(30) Foreign Application Priority Data
Apr. 29, 2013 (AU) ................. 2013901486

(51) Int. Cl.
| | |
|---|---|
| *H04N 19/176* | (2014.01) |
| *H04N 19/172* | (2014.01) |
| *H04N 19/46* | (2014.01) |
| *A63F 13/23* | (2014.01) |
| *A63F 13/77* | (2014.01) |
| *G07F 17/32* | (2006.01) |
| *H04N 19/105* | (2014.01) |
| *H04N 19/593* | (2014.01) |
| *H04N 19/107* | (2014.01) |
| *H04N 19/136* | (2014.01) |
| *H04N 19/137* | (2014.01) |

(52) U.S. Cl.
CPC .......... *H04N 19/176* (2014.11); *A63F 13/23* (2014.09); *A63F 13/77* (2014.09); *G07F 17/32* (2013.01); *H04N 19/105* (2014.11); *H04N 19/107* (2014.11); *H04N 19/136* (2014.11); *H04N 19/137* (2014.11); *H04N 19/172* (2014.11); *H04N 19/46* (2014.11); *H04N 19/593* (2014.11)

(58) Field of Classification Search
CPC .. H04N 19/176; H04N 19/172; H04N 19/167; H04N 19/46; H04N 19/182; A63F 13/23; A63F 13/77
See application file for complete search history.

(56) References Cited

U.S. PATENT DOCUMENTS

| | | | |
|---|---|---|---|
| 2010/0111183 A1* | 5/2010 | Jeon ..................... | H04N 19/597 375/240.16 |
| 2010/0284464 A1* | 11/2010 | Nagori ................. | H04N 19/105 375/240.15 |

\* cited by examiner

*Primary Examiner* — Huy T Nguyen
(74) *Attorney, Agent, or Firm* — Lerner, David, Littenberg, Krumholz & Mentlik, LLP

(57) ABSTRACT

A video compression technique relates to gaming machines which comprise a display to display images; a user interface to receive input from displayed screen images; a memory; and a game controller configured to control display of the images and process input received via the user interface. The game controller is further configured to receive an image sequence comprising a plurality of frames and, for each frame, to divide the frame into a series of blocks; compress each of the blocks using a first compression technique to form a series of compressed blocks; for each compressed block in the frame, identify whether the block is identical to a previous block within the frame and, if so, replace the compressed block with an index to the previous block; for each compressed block in the frame, determine a data difference between the compressed block and a corresponding block in an immediately preceding frame.

18 Claims, 4 Drawing Sheets

GAMING MACHINE AND METHOD EMPLOYING VIDEO COMPRESSION

CROSS-REFERENCE TO RELATED APPLICATIONS

The present application claims priority from Australian Provisional Patent Application No 2013901486 filed on 29 Apr. 2013, the content of which is incorporated herein by reference.

TECHNICAL FIELD

Described embodiments generally relate to video compression techniques. In particular, described embodiments are directed to compression techniques favouring fast decoding and play back.

BACKGROUND

When generating, storing, and playing back video sequences, it is often desirable to compress the video files, most often to reduce file size. Video compression algorithms designed to reduce video file size often use codecs that combine spatial image compression and temporal motion compensation to reduce the binary data size of the image sequences. Many of these video compression algorithms use lossy compression, and there is always a trade-off between video quality, compression data size, decompression system requirements and cost of compression.

When playing video sequences on gaming machines, the time taken to decode and display the images of a video sequence is often a primary consideration. However, traditional compression techniques that place high importance on file size are often slow to decode.

Furthermore, a majority of video compression algorithms operate in YUV colour space or RBG colour space. Most video codecs are designed to minimise file size, while very few are designed to minimise decode/display times.

It is desired to address or ameliorate one or more shortcomings or disadvantages associated with prior techniques for the compression and decompression of video data in a gaming machine, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments relate to a gaming machine, comprising:
a display to display images;
a user interface to receive input in relation to displayed screen images;
a memory; and
a game controller configured to access the memory, control display of the images and process input received via the user interface, the game controller further configured to receive an image sequence comprising a plurality of frames and, for each frame, to:
  divide the frame into a series of blocks;
  compress each of the blocks using a first compression technique to form a series of compressed blocks;
  for each compressed block in the frame, identify whether the block is identical to a previous block within the frame and, if so, replace the compressed block with an index to the previous block;
  for each compressed block in the frame, determine a data difference between the compressed block and a corresponding block in an immediately preceding frame;
  determine a number of the compressed blocks that have a data difference of zero;
  if the number of data blocks having a data difference not equal to zero is greater than a limit, store the frame as a keyframe;
  if the number of data blocks having a data difference not equal to zero is less than the limit, store the number of data blocks having a data difference not equal to zero, the block location of each block having a data difference not equal to zero, and the data difference block; and
  append the frame with a header containing information to assist in decompressing the frame.

The game controller may be further configured to, for each block in the frame having a data difference not equal to zero, identify whether the block is identical to a previous block within the frame and, if so, replace the block with an index to the previous block.

In some embodiments, the controller is further configured to use a second compression algorithm to further compress each frame, and to store the further compressed frame instead of the compressed frame if the further compressed frame is smaller than a set limit.

In some embodiments, the information stored in the header of each frame includes whether the frame is a keyframe, the size of the frame and a frame timestamp.

In some embodiments the first compression technique may comprise a block partition texture compression (BPTC) process, for example. The frames may comprise RGBA pixel data, for example. In some embodiments, the second compression technique may comprise a fast compression algorithm, such as an LZ4 compression algorithm.

The game controller may be further configured to decompress and reassemble the image sequence in response to a software request for display of the image sequence.

Some embodiments relate to a method of video compression in a gaming machine, the method comprising for each frame of an image sequence comprising a plurality of frames:
  dividing the frame into a series of blocks;
  compressing each of the blocks using a first compression technique to form a series of compressed blocks;
  for each compressed block in the frame, identifying whether the block is identical to a previous block within the frame and, if so, replacing the compressed block with an index to the previous block;

for each compressed block in the frame, determining a data difference between the compressed block and a corresponding block in an immediately preceding frame;

determining a number of the compressed blocks that have a data difference of zero;

if the number of data blocks having a data difference not equal to zero is greater than a limit, storing the frame as a keyframe;

if the number of data blocks having a data difference not equal to zero is less than the limit, storing the number of data blocks having a data difference not equal to zero, the block location of each block having a data difference not equal to zero, and the data difference block; and appending to the frame a header containing information to assist in decompressing the frame.

The method may further comprise, for each block in the frame having a data difference not equal to zero, identifying whether the block is identical to a previous block within the frame and, if so, replacing the block with an index to the previous block.

Some embodiments relate to computer-readable storage storing executable program code that, when executed by a game controller, causes the game controller to perform the methods described above and/or implement the features and functions of the game machine or game system described above.

BRIEF DESCRIPTION OF DRAWINGS

Embodiments are described in further detail below, by way of example and with reference to the accompanying drawings, in which.

DETAILED DESCRIPTION

Figure 1:
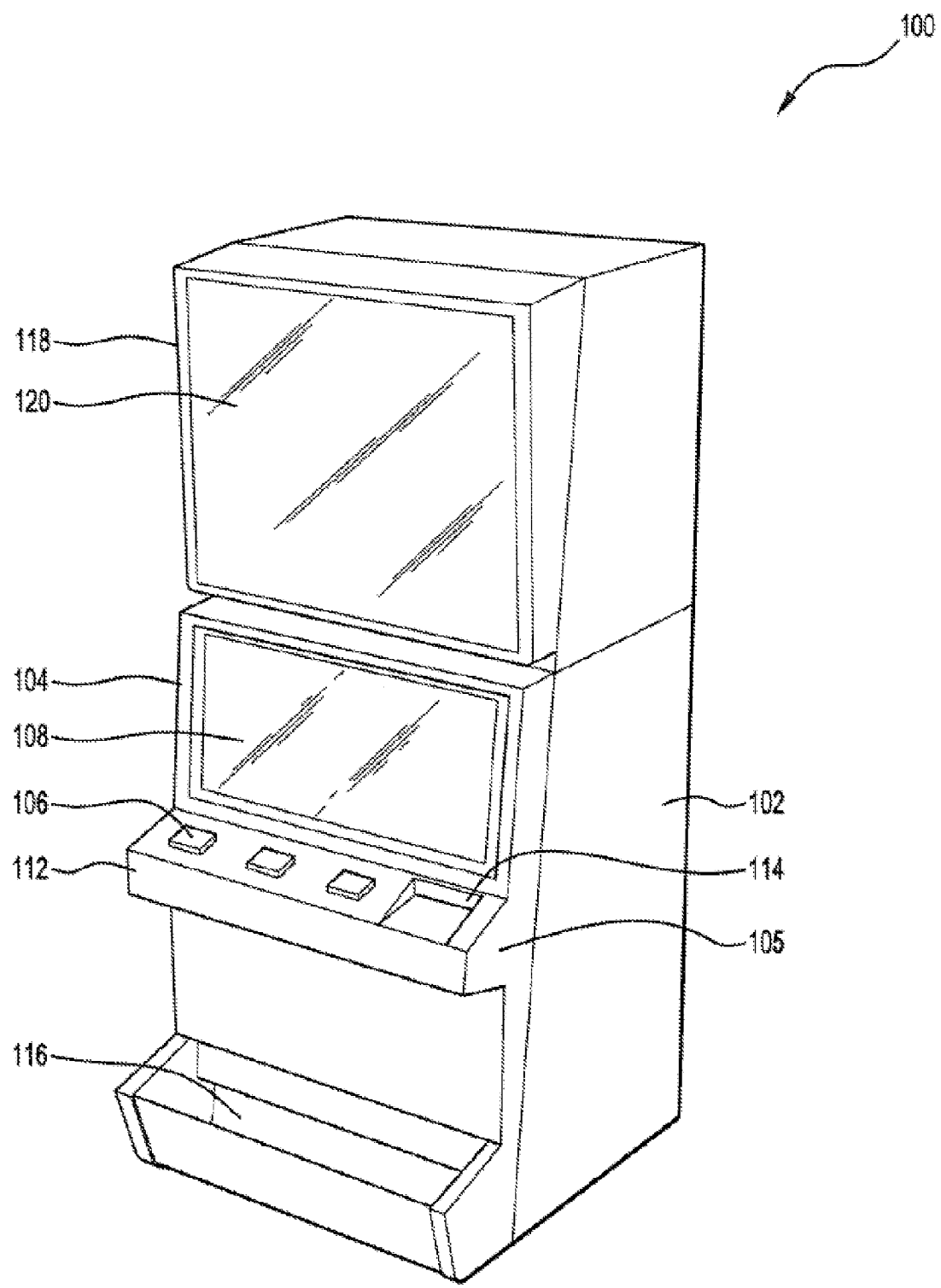
FIG. 1 shows a perspective view of a gaming machine.

Described embodiments generally relate to video compression techniques. In particular, described embodiments are directed to compression techniques favouring fast decoding and play back. The video compression according to some embodiments may use partitioned block compression and temporal data differencing in order to create compressed video images that are quickly decompressible for quick playback of images comprising RGBA data.

Video Compression Using Partitioned Block Texture Compression (BPTC)

Compressed images may be represented as a collection of 4×4 pixel blocks, where each pixel uses 32 bytes of RGBA data (8 bits for red, 8 bits for green, 8 bits for blue and 8 bits for alpha). A block contains 128 bits data (16 octets). Each block contains a number of RGBA colour pairs from which several interpolation gradients can be constructed. Several algorithms can be used to construct the gradient, and the selected algorithm index is also contained in each block. Each block is partitioned into groups of pixels (up to 64 partitions). A colour index table is constructed from the block gradient for each partition. When constructing the final decompressed image, the destination pixel colour is determined from the colour pair index, partition index and the gradient colour index from the enclosing block.

Once the compressed image composed of many 4×4 pixel blocks is created, duplicate blocks are identified and replaced with an index to the initial block.

Data Differencing

The reference image frames (keyframes) use partitioned block compression, while inter-frame images use a selected differential compression process. The inter-frames contain delta blocks, which are used to patch the reference image to create a target image. The target image becomes the reference image for the subsequent inter-frame.

Video Container

A video container metafile format may be used that contains a header which describes the video properties (width, size, frame, rate, duration, etc). Each frame has an associated header which identifies the frame (reference frame or inter-frame), frame size and a frame timestamp. An inter-frame contains an index to the data differencing algorithm applied, a count of delta blocks and coordinates of each delta block.

The described video compression processes are designed to create BPTC (also known as BC7) compressed video image textures in a format that is suitable for hardware accelerated graphics cards. This is most advantageous where fast decoding and playback of video images with transparent pixels is required. The described video compression processes are suitable for environments where many videos are displayed simultaneously on the same screen or on multiple related screens associated with the same gaming machine. The described video compression processes are not suitable for environments where smaller file sizes are desirable.

Compression

Following is an example compression process for video image data defining a series of video frames according to some embodiments. For each uncompressed frame in the video sequence, do the following:

1) Compress each frame using Partitioned Block Compression (BPTC). This is an industry standard compression scheme. A compressed frame is composed of many compressed blocks (4×4 pixels).
2) For each compressed frame, identify identical blocks (using binary comparison). If an identical block is found, store an index to the initial occurrence instead of the compressed block.
3) For each compressed block, determine the data difference (delta) between the current frame block and the previous frame block.
4) If the number of blocks is greater than a set limit, then treat the compressed block frame as a new keyframe and store the outcome of step 2 as a keyframe.
5) Otherwise, store a count of delta blocks for this frame, and for each delta block, store the block location, as well as the data difference (delta). If an identical block exists elsewhere in the frame, store an index to the identical block instead.
6) Optionally use a fast compression algorithm (like LZ4) to further compress each keyframe and delta frame. If the compressed size is smaller than a set limit, then store the compressed keyframe/delta frame, otherwise store the uncompressed keyframe (2)/delta frame(5).
7) Each frame is stored with a frame header which identifies the frame type and compression algorithm(s) used.

Decompression

Video decompression is generally performed as the reverse of the compression process. As an example decompression process, the following process may be performed for each frame:

1) Read the frame header. Read (and decompress) the frame data based on the compression algorithm used.
2) If the frame is a keyframe, replace the existing frame buffer data with the new keyframe data. Some keyframe blocks are duplicates and only store the initial block index.
3) Otherwise, the frame is a delta frame (inter-frame). For each delta block, identify the block location and copy the new block data to the existing frame buffer. 16 pixels will be copied.
4) The updated frame buffer can be now used as a keyframe for subsequent frames.

The video compression process is shown and described in further detail below with reference to the flowchart of FIG. 4.

Gaming Machine

Referring now to FIG. 1, reference numeral 100 generally designates a stand-alone gaming system including a gaming machine on which the described video compression techniques are employed during the automated conduct of one or more games of chance. By stand-alone, the applicant is referring to a system which can operate by itself with a player and which requires no further interaction from other systems. Hereinafter, the stand-alone gaming system 100 will be referred to as a gaming machine.

The gaming machine 100 includes a console 102 which contains all or most components required to implement a game play whereby a player wins or loses a wager. Access to the components is by way of a hinged door 105. Moulded to the exterior of the console 102 is a display means in the form of at least one visual display unit 104 on which one or more games is played. The video display unit 104 may be implemented as a liquid crystal display, a plasma screen, as a cathode ray screen device or the like. Whilst the console 102 illustrated in FIG. 1 shows a single visual display unit 104, there can be more than one visual display unit on a typical machine. What is displayed on the visual display unit 104 will depend on what the intended goal of the unit is in relation to the player and any other potential participants in the gaming system.

The gaming machine includes a tactile input for a player to interact via touch with the gaming machine 100. In this example, the tactile input is in the form of a combination of pushbuttons 106 and a touch screen 108 for enabling a player to play one or more games. The touch screen is an electronic visual display that can detect the presence and location of a touch within the display area. The touch screen 108 is used during the game play between start of a game and the end of a game. A game is considered to have started once a wager is placed and considered complete once the wager has been lost or won. Certain functions of the pushbutton are: initiation of game play, credit output, gameplay selection, completion of gameplay etc. A midtrim 112 of the machine 100 houses the pushbuttons 106.

The tactile input may optionally or further include a joystick comprising of a stick that pivots on a base and reports its angle or direction to the device it is controlling. The tactile input may optionally or further include a trackpad/touchpad being a pointing device featuring a tactile sensor to translate the motion and position of a user's fingers to a relative position on screen.

It should be appreciated that tactile input may include any suitable device that enables the player to produce an input signal that is received by the processor. Tactile input in the form of pushbuttons 106 and/or regions on touch screen 108 may include a one bet button, a max bet button, or a repeat the bet button. With a one bet button for instance, the player places a bet by pushing the one bet button. The player may increase the bet by one credit each time the player pushes the bet one button.

The midtrim 112 also houses credit input device including a bill collector 114. The credit input device may further include a coin input chute, a card and/or ticket reader, a magnetic reading head for reading a magnetic stripe card, an electronic reader for a proximity card, a near field communications reader or any other form of electronic, wireless or contact that can input credit to the gaming machine.

A credit dispenser in the form of a coin tray 116 is mounted beneath the console 102 and is provided for cash payouts from the machine 100 to the player. A hopper device (not shown) is provided which dispenses coins, or tokens equal to the amount of credit currently on the machine, into the coin tray 116. Aside from the coin tray 116, the credit dispenser may also include a ticket dispenser for issuing a ticket dispensed by a printer which the user can redeem for cash, a note dispenser, a near field communications transmitter or means to enable remote credit transfer. It should be appreciated that any suitable payout mechanisms, such as funding to the player's electronically recordable identification card or smart card, may be implemented in accordance with the gaming machine disclosed herein.

The gaming machine 100 includes a top box 118 on which artwork 120 is carried in the form of electronic visual display units. The artwork 120 could also be made from physical materials such as paper, plastic banners or posters. The artwork 120 may have generic information related to the machine or gaming system or the artwork 120 be specifically made for a particular game to be played on the machine 100. Whilst the artwork 120 is shown as being carried on the top box 118 the art work 120 can also be positioned in or on the bottom panel of the door 105, or any other part of the gaming machine 100 visible to the player.

The gaming machine 100 further includes an auditory unit in the form of speakers (not shown) to provide auditory feedback to the player of the gaming machine 100.

Figure 2:
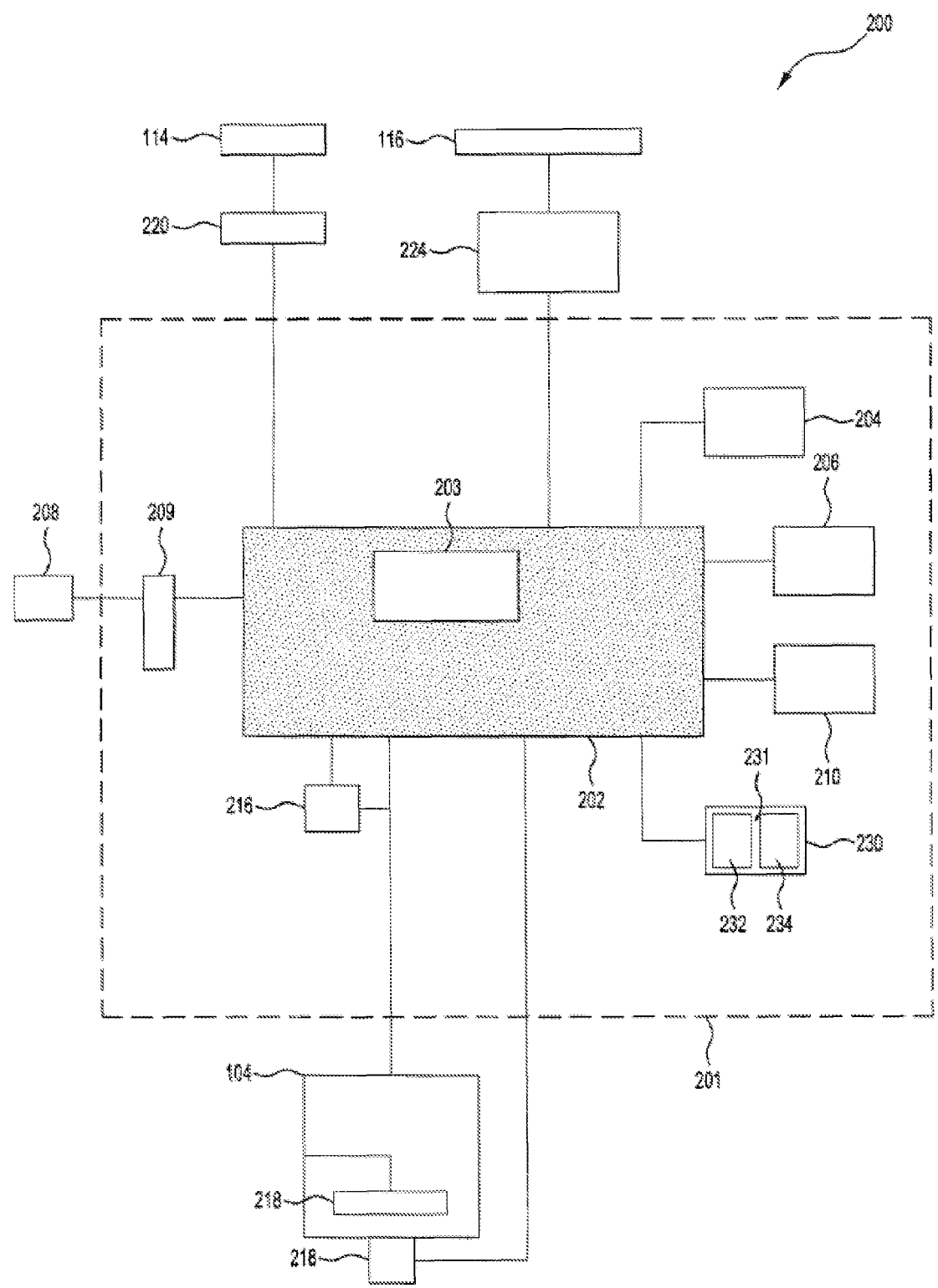
FIG. 2 shows a block diagram of a game logic circuit of the gaming machine illustrated in FIG. 1.

Referring to FIG. 2 of the drawings, game logic circuitry 200 is illustrated. The game logic circuitry 200 includes a gaming controller 201 (otherwise referred to as a logic cage) designated by the dashed lines. As will be appreciated by those skilled in the gaming industry, the logic cage 201 includes a box-like mechanical structure that has slots to guide logic cards into the proper location for electronically plugging into a backplane mounted at the rear of the cage structure. The backplane has connectors for accepting mating connectors on the logic cards. The logic cage and associated cards form one of the basic components of the gaming machine 100 and is securely housed within the cabinet of the gaming machine 100.

Central to the logic cage is a central processing unit 202 such as a processor, a microcontroller-based platform, a suitable integrated circuit, or one or more application-specific integrated circuits (ASIC's). The processor 202 is in communication with or operable to access or to exchange signals with an outcome evaluator 203, RAM 204, ROM 206, a non-volatile memory in the form of a compact flash 230, an audio output 208 via an audio control module 209, and a random number generator 210. Gaming machine 100 may also include other non-volatile memory, including relatively fast forms and relatively slow forms of non-volatile memory to store compressed video for playback on demand, where the non-volatile memory is accessible to processing elements of the gaming machine, such as CPU 202 and associated digital signal processors (including codecs) and controllers. The audio control module 209 has its own digital signal processor, analogue to digital converters, amplifiers and other circuitry necessary to broadcast the output from the speakers. RAM 204 may include non-volatile RAM (NVRAM), magnetic RAM (MRAM), ferro-electric RAM (FeRAM), and other forms as commonly understood in the gaming industry.

Compact flash memory 230 may be physically secured within a slot in the logic cage 201. In one embodiment, the compact flash memory 230 is physically secured inside the logic cage within game logic circuitry 200 by a mechanical locking mechanism. Compact flash memory 230 is partitioned 231 into two parts. A first part comprises a game software module 232 and a second part comprises a metering information module 234.

The processor 202 runs executable code residing in game software module 232 of compact flash 230 that facilitates play of the game by a player through the display device and/or push buttons and touch sensors mounted in the screen of the display. Metering information module 234 contains the gaming machine parameters which include values that would usually be stored on a hard meter. The values in metering information module 234 are only ever incremented, and cannot be reset or decremented. The only way to alter the values stored is by running the executable code stored in game software module 232, which is executed by processor 202. The executable code further interacts with the credit dispenser 116 via a payout mechanism 224 and the auditory output 208. The game software module 232 contains the rules of the game, the sequence of gameplay, communicates with external systems, monitors peripheral equipment and maintains the integrity of the software code, etc. The processor 202 continually checks for error conditions.

Stored executable programs which implement the game logic circuitry 200 and the user interface are executed by the central processing unit 202. The processor 202 cooperates with (and may be considered to form a cooperating functional part of) a video controller 216 that drives the screen 108 (and possibly multiple such screens) of the video display unit 104. The video controller 216 may thus decode/decompress and display stored compressed video image textures. The video controller 216 may receive input signals from sensors 218. The sensors 218 may include sensors associated with the push buttons on the console and touch sensors mounted in the screen of the video display unit 104, for example. The controller 216 may also receive input pulses from mechanisms 220 and 224 to determine whether or not a player has provided sufficient credit from either payment device 114 or payment device 116 to commence playing.

In one embodiment, a player may insert an identification card into a card reader (not shown) of the gaming machine 100. Such an identification card may be a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a mobile phone, a radio frequency identification tag, or any other suitable wireless device, that communicates a player's identification, credit totals (or related data), and other relevant information to the gaming device.

Figure 3:
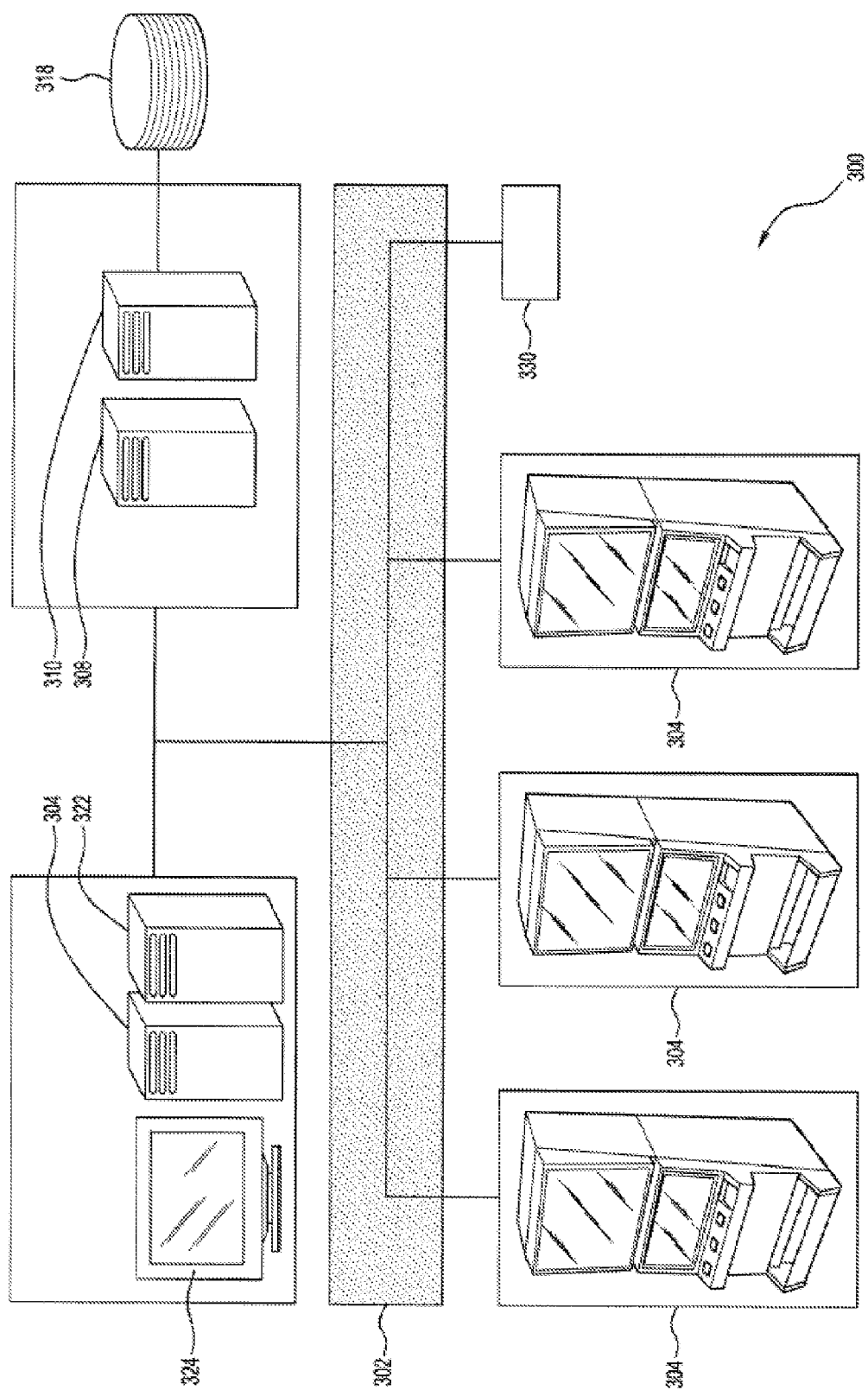
FIG. 3 shows a block diagram of functional components of a gaming system incorporating gaming machines illustrated in FIGS. 1.

One or more of the method steps described in this disclosure may be implemented by executable instructions and parameters 232, 234, stored in the memory 204, 206, 230, that may form software embodiments of the system 100. These instructions 232, 234 that form the system 100 may be executed by the CPU 202 or any other processor. Further, the processor 202, the memory 204, 206, 230, the instructions 232, 234 stored therein, or a combination thereof may serve as a means for performing one or more of the method steps described herein FIG. 3 shows a gaming system 300 in accordance with an alternative embodiment. The gaming system 300 includes a network 302, which for example may include an Ethernet network. The network 302 may also comprise a wide area network ("WAN"), the plain-old-telephone-system ("POTS), a local area network ("LAN"), a wireless LAN, the Internet, or any combination of these and other types of networks. Gaming machines 304 are connected to the network 302. The gaming machines 304 provide a player operable interface and may be the same as the gaming machines 100 shown in FIG. 1 or may have simplified functionality depending on the requirements for implementing game play.

In a thick client embodiment, game server 308 implements part of the game played by a player using a gaming machine 304 and the gaming machine 304 implements part of the game. With this embodiment, as both the game server 308 and the gaming device implement part of the game, they collectively provide a game controller. A database management server 310 may manage storage of game programs and associated data for downloading or access by the gaming devices 304 in a database 318.

In a thin client embodiment, game server 308 implements most or all of the game played by a player using a gaming machine 304 and the gaming machine 304 essentially provides only the player interface. With this embodiment, the game server 308 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 300, including for example a gaming floor management server 320, and a licensing server 322 to monitor the use of licenses relating to particular games. An administrator terminal 324 is provided to allow an administrator to run the network 302 and the devices connected to the network.

The gaming system 300 may communicate with other gaming systems, other local networks, for example a corporate network, and/or a wide area network such as the Internet, for example through a firewall 330.

Persons skilled in the art will appreciate that in accordance with known techniques, functionality at the server side of the network may be distributed over a plurality of different computers. For example, elements may be run as a single "engine" on one server or a separate server may be provided. For example, the game server 308 could run a random generator engine. Alternatively, a separate random number generator server could be provided. Further, persons skilled in the art will appreciate that a plurality of game servers could be provided to run different games or a single game server may run a plurality of different games as required by the terminals.

Figure 4:
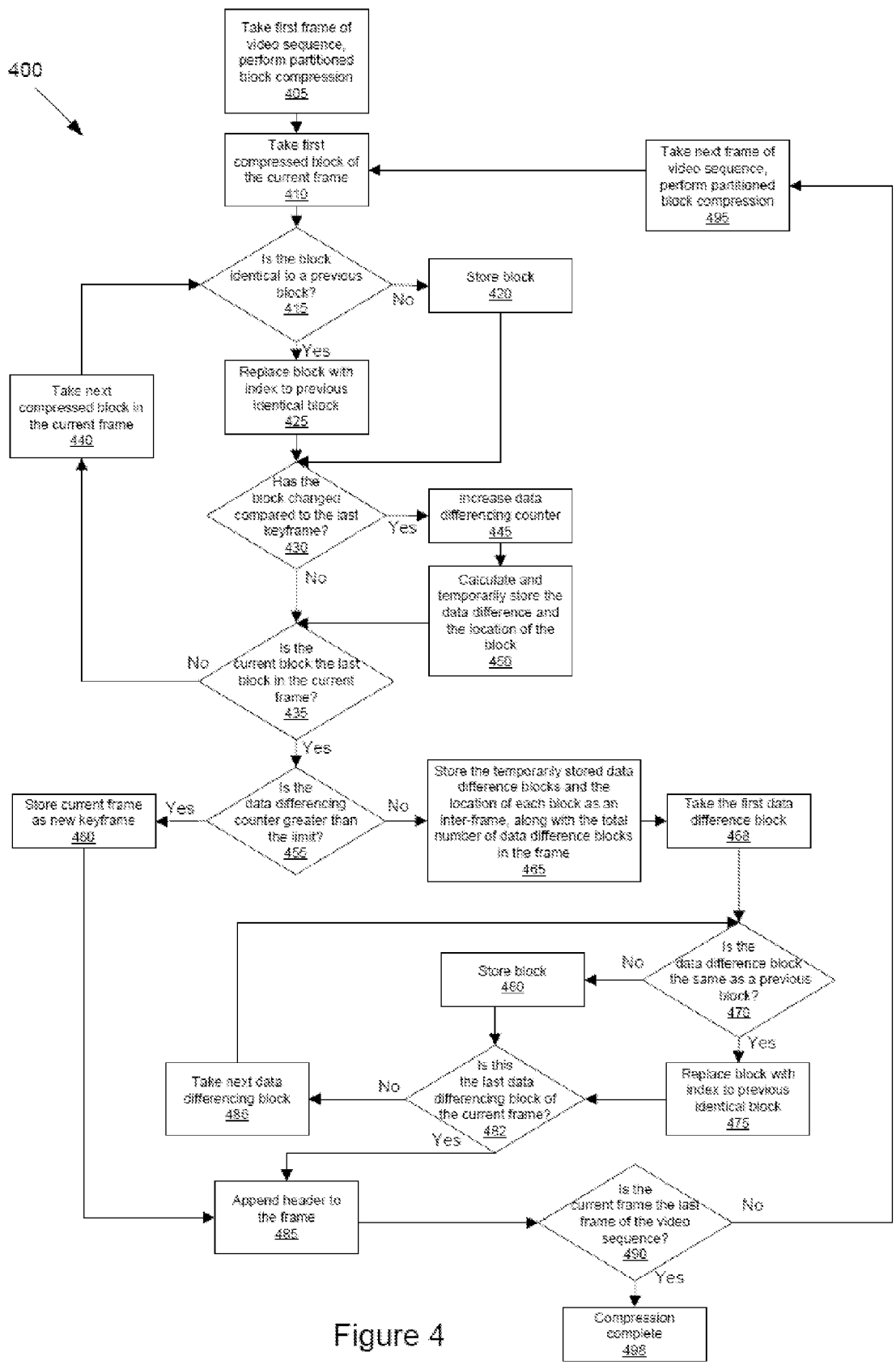
FIG. 4 is a flowchart depicting the process of the game controller of the gaming machine illustrated in FIG. 1 compressing a video sequence.

Referring now to FIG. 4, a flow diagram of a process 400 of compressing a video image sequence is depicted. At step 405, controller 216 takes a first frame of a video sequence and performs a first compression technique on that frame. This compression technique may be a partitioned block compression technique, such as BPTC (also known as BC7) compression, for example.

The first of the resultant blocks of the first compression technique is passed to controller 216 at step 410. If this block is a new block, it is stored in a temporary frame at step 420. Alternatively, if there exists a previous block of the frame that is identical to the current block, an index to the previous block is stored instead, at 425. For storage and memory reasons, identical blocks can only index parent blocks from the same frame. Each block has an index (e.g. 1, 2, 3, 4 . . . ) corresponding to its x/y position in the frame. When searching for duplicate blocks, the search is conducted from 1 to the current block index number (i.e. by searching backwards in the current frame). Each 4×4 block has a unique index which also corresponds to an x/y position in the frame. For example, block #1=(0,0), block #2=(4,0), block #3=(8,0) . . . block #20=(0,4), block #21=(4,4), block #22=(8,4), etc.

Next, the current block is compared to the corresponding block of the immediately preceding frame at 430. If the block has changed from the reference frame, a data differencing counter is incremented at 445, and the difference between the current block and the corresponding block of the previous frame is stored temporarily at 450 as a data difference (delta) block. From the block index of the changed frame, the controller 216 determines which 4×4 block from the reference frame (previous frame) to replace with the delta block when encoding the current frame. If there is no difference between the current block and the corresponding block of the previous frame, then no extra action is taken.

At step 435, controller 216 determines whether the current block is the last block of the current frame. If it is not the last block, a new block is taken at step 440 and the process repeats from step 415 with the new block.

If the current block is the last block of the current frame, controller 216 compares the value in the data differencing counter with a threshold data differencing limit at step 455. If the data differencing counter is greater than the limit, the current frame is stored as a new keyframe at 460. Alternatively, the temporarily stored data difference blocks are stored, along with the location of each block and the total number of data difference blocks, as an inter-frame, at 465.

For clarity of description, it is noted that a keyframe is what is stored in the storage media. Once loaded into fast memory for display, it becomes the current frame as well as the reference frame for the next frame. In the current context, "inter-frame" and "delta frame" refer to the same thing. Inter frames are frames in the video sequence that are in between keyframes and they contain frame delta/difference data. The image changes/differences described in the delta frame are appended to the reference frame to create a new reference frame.

The threshold data differencing limit is a configurable setting, which may be equated to or set as a percentage amount of the total number of blocks in the frame. An example default threshold data differencing limit may be set at 50% of the number of blocks in the frame. Because each delta block has a storage and computational overhead associated with it, and the frame size of an inter-frame comprising many delta blocks (with an associated additional overhead of having a delta block count and delta block positions for each block) may exceed the frame size of a keyframe, it may not be computationally cost-effective to store the frame as an inter-frame. Reconstruction of a frame from many delta blocks may also be relatively computationally expensive. Seeking (adjusting the position in a video stream) is also inefficient with a larger number of delta blocks.

The first block of the inter-frame is then taken at 468 and compared to the previous data difference blocks in that inter-frame at 470. If it is a repeated block, the block is replaced with an index to the location in which it first appears, at 475. Alternatively the block is stored at 480. Controller 216 then determines whether this is the last data difference block of the inter-frame at 482. If it isn't the last block, the next block is taken at 486 and the process repeats from step 470.

Otherwise, the current frame may be further compressed by a fast compression algorithm, such as LZ4 for example, depending on whether such further compression would computationally cost-effective. The controller 216 is preferably configurable to set a threshold for determining whether to further compress a frame with a suitable fast compression algorithm. For example, a default setting of 80% may be applied as the threshold, such that if the file compression savings is not greater than 80% of the original file size, then the original frame will be stored with no additional compression. If the file compression savings is at or above the threshold, then the frame will be compressed. The threshold will generally be set such that the computational cost of decompressing the frame should not outweigh the benefit of the smaller file storage needed for the compressed frame.

Once the frame compression is determined to be complete at 482, a header is then appended by the controller 216 to the frame at 485, containing identifying details of the compression method(s) used for the frame. If the frame is determined to be the last frame of the sequence at 490, the compression is determined to be complete at step 498. Otherwise, the next frame is taken and compressed using the first compression algorithm at 495, and the process is repeated from step 410.

The described video encoding (compression) may be performed during game development and then stored into the non-volatile memory of the gaming machine 100. The compressed video is then subsequently loaded from the non-volatile memory, decompressed and played back in response to a function call executed as part of execution of the game software 232.

Unlike conventional video playback devices, which only play one full screen video at a time, on a gaming machine 100 according to described embodiments there may be many videos played simultaneously on multiple display devices. For instance, in a reel spinning game, one full screen background video may be playing, each symbol on the gaming machine can also have an attached video, a banner animation may be played back over all symbols, and auxiliary screens may also be playing full screen videos. It is possible to have dozens (>12) of videos played at the same time, some full screen, some only on a portion of the screen. A large number of these videos will have alpha (transparent) pixels and it may be necessary to see what is behind these videos as well (videos may be layered on top of each other, each video may have transparent sections).

It is computationally very expensive to decode videos, so an efficient (decode and display) format is necessary. The traditional video compression techniques (MPEG1-4, H.264, WebM, Theora, Dirac, etc) are designed to minimize file size and to only display a single full screen video at once. Such techniques are not designed to favour decompression speed or display speed. The described video codec is designed for fast decompression/display so that multiple, possibly dozens, of layered videos can be displayed simultaneously. A consequence of this is that the file size of the videos can be much greater than with other video codecs.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Certain steps in the processes or process flows described in this disclosure naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention.

The claims defining the invention are as follows:

1. A gaming machine, comprising:
    a display to display images;
    a user interface to receive input in relation to displayed screen images;
    a memory; and
    a game controller configured to access the memory, control display of the images and process input received via the user interface, the game controller further configured to receive an image sequence comprising a plurality of frames and, for each frame, to:
    divide the frame into a series of blocks;
    compress each of the blocks using a first compression technique to form a series of compressed blocks;
    for each compressed block in the frame, identify whether the block is identical to a previous block within the frame and, if so, replace the compressed block with an index to the previous block;
    for each compressed block in the frame, determine a data difference between the compressed block and a corresponding block in an immediately preceding frame;
    determine a number of the compressed blocks that have a data difference of zero;
    if the number of data blocks having a data difference not equal to zero is greater than a limit, store the frame as a keyframe;
    if the number of data blocks having a data difference not equal to zero is less than the limit, store the number of data blocks having a data difference not equal to zero, the block location of each block having a data difference not equal to zero, and the data difference block; and
    append the frame with a header containing information to assist in decompressing the frame.

2. The gaming machine of claim 1, wherein the game controller is further configured to, for each block in the frame having a data difference not equal to zero, identify whether the block is identical to a previous block within the frame and, if so, replace the block with an index to the previous block.

3. The gaming machine of claim 1, wherein the game controller is further configured to use a second compression algorithm to further compress each frame, and to store the further compressed frame instead of the compressed frame if the further compressed frame is smaller than a set limit.

4. The gaming machine of claim 1, wherein the information stored in the header of each frame includes one or more of whether the frame is a keyframe, the size of the frame and a frame timestamp.

5. The gaming machine of claim 1, wherein first compression technique comprises a block partition texture compression (BPTC) process.

6. The gaming machine of claim 1, wherein the frames comprise RGBA pixel data.

7. The gaming machine of claim 1, wherein the second compression technique comprises a fast compression algorithm.

8. The gaming machine of claim 7, wherein the fast compression algorithm comprises an LZ4 compression algorithm.

9. The gaming machine of any one of claim 1, wherein the game controller is further configured to decompress and reassemble the image sequence in response to a software request for display of the image sequence.

10. A method of video compression in a gaming machine, the method comprising for each frame of an image sequence comprising a plurality of frames:
dividing the frame into a series of blocks;
compressing each of the blocks using a first compression technique to form a series of compressed blocks;
for each compressed block in the frame, identifying whether the block is identical to a previous block within the frame and, if so, replacing the compressed block with an index to the previous block;
for each compressed block in the frame, determining a data difference between the compressed block and a corresponding block in an immediately preceding frame;
determining a number of the compressed blocks that have a data difference of zero;
if the number of data blocks having a data difference not equal to zero is greater than a limit, storing the frame as a keyframe;
if the number of data blocks having a data difference not equal to zero is less than the limit, storing the number of data blocks having a data difference not equal to zero, the block location of each block having a data difference not equal to zero, and the data difference block; and
appending to the frame a header containing information to assist in decompressing the frame.

11. The method of claim 10, further comprising the step of, for each block in the frame having a data difference not equal to zero, identifying whether the block is identical to a previous block within the frame and, if so, replacing the block with an index to the previous block.

12. The method of claim 10, further comprising the step of using a second compression algorithm to further compress each frame, and to store the further compressed frame instead of the compressed frame if the further compressed frame is smaller than a set limit.

13. The method of claim 10, wherein appending to the frame a header containing information to assist in decompressing the frame comprises appending to the frame a header containing one or more of whether the frame is a keyframe, the size of the frame and a frame timestamp.

14. The method of claim 10, wherein the first compression technique comprises a block partition texture compression (BPTC) process.

15. The method of claim 10, wherein the second compression technique comprises a fast compression algorithm.

16. The method of claim 15, wherein the fast compression algorithm comprises an LZ4 compression algorithm.

17. The method of claim 10, further comprising the step of decompressing and reassembling the image sequence in response to a software request for display of the image sequence.

18. Computer-readable storage storing executable program code that, when executed by a game controller, causes the game controller to perform the method of claim 10.

* * * * *